(12) United States Patent
Mei

(10) Patent No.: US 8,577,185 B2
(45) Date of Patent: Nov. 5, 2013

(54) APPARATUS AND METHOD FOR INTERPOLATING AND RENDERING IMAGE ON MOBILE DEVICES

(75) Inventor: Chunhui Mei, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 12/725,866

(22) Filed: Mar. 17, 2010

(65) Prior Publication Data

US 2011/0229021 A1 Sep. 22, 2011

(51) Int. Cl.
*G06K 9/32* (2006.01)

(52) U.S. Cl.
USPC .......................................................... 382/300

(58) Field of Classification Search
USPC .......................................................... 382/300
See application file for complete search history.

(56) References Cited

U.S. PATENT DOCUMENTS

| | | | |
|---|---|---|---|
| 6,236,433 B1 * | 5/2001 | Acharya et al. | 348/273 |
| 2005/0163402 A1 * | 7/2005 | Aiso | 382/300 |
| 2006/0269163 A1 * | 11/2006 | Case | 382/293 |
| 2010/0073732 A1 * | 3/2010 | Matsunaga | 358/447 |
| 2010/0119176 A1 * | 5/2010 | Ichihashi et al. | 382/300 |

FOREIGN PATENT DOCUMENTS

JP 2009060329 A * 3/2009

* cited by examiner

*Primary Examiner* — Nirav G Patel
(74) *Attorney, Agent, or Firm* — Jefferson IP Law, LLP

(57) ABSTRACT

An apparatus and method for efficiently interpolating and rendering transformed images on mobile devices are provided. The method includes obtaining a plurality of super pixels by virtually increasing a resolution of the original image, determining a sampling position of a target image pixel under transformation, selecting the nearest super pixel from the plurality of super pixels for the target image pixel, and determining a characteristic of the selected nearest super pixel for the target image pixel. The apparatus and method render a transformed image having image quality comparable to that achieved by bilinear interpolation method while significantly reducing the necessary calculation cost.

16 Claims, 5 Drawing Sheets

US 8,577,185 B2

APPARATUS AND METHOD FOR INTERPOLATING AND RENDERING IMAGE ON MOBILE DEVICES

BACKGROUND OF THE INVENTION

1. Field of the Invention

The present invention relates to an apparatus and method for interpolating and rendering images on mobile devices. More particularly, the present invention relates to an apparatus and method for rendering a high quality interpolated image at a high speed on mobile devices.

2. Description of the Related Art

Mobile terminals were developed to provide wireless communication between users. As technology has advanced, mobile terminals now provide many additional features beyond simple voice communication. For example, mobile terminals are now able to provide additional functions such as Multimedia Message Service (MMS), E-mail, games, digital camera, multimedia function for providing audio and video content, and many more. With the plurality of features now provided, a mobile terminal has effectively become a necessity of daily life.

One aspect of the mobile terminal that has been particularly advanced is the ability to render and process high quality images, such as for a user interface and mobile applications. While the graphics content has become dramatically enriched, and with the fast development of the mobile Internet platform, the graphics functionality of mobile handsets has become an important issue for the handset industry. For example, vector graphics images and animations have become very popular on mobile terminals and essential for smart phones. The rich content of a user interface and mobile applications demands efficient image and graphics rendering methods on the mobile terminals, especially because of their limited processing power. An important rendering method in the mobile graphics platform is image interpolation. Appropriate image interpolation methods apply a geometric transformation, such as rotation, scaling, skewing, and the like on the images to render a smooth output without aliasing.

In 2-Dimensional (2D) image processing, there are several methods by which to interpolate and render an image. Two such methods are nearest neighbor interpolation and bilinear interpolation.

FIG. 1 illustrates an interpolation using the nearest neighbor technique according to the prior art.

Referring to FIG. 1, an image is comprised of a matrix of pixels 100, including a pixel 101. When the image is transformed, for example when the image is enlarged, rotated, and the like, the new pixel matrix is mapped backward to the original image space that includes new pixel 103. To determine the characteristics of pixel 103 using the nearest neighbor technique, the graphics engine on mobile terminal determines which pixel from the original matrix 100 is closest to the location of pixel 103. Having determined that pixel 101 is closest to pixel 103 and thus the nearest neighbor, the mobile terminal applies the characteristics of pixel 101 to new pixel 103.

The nearest neighbor technique, also called the point sampling technique, is a very fast method of transforming an image because the characteristics of the new pixel 103, such as its color value, are simply applied based on the characteristics of its nearest neighbor. In the example of FIG. 1, the characteristics of nearest neighbor pixel 101 are directly applied to the new pixel 103. Accordingly, because its complexity is minimal, the nearest neighbor algorithm can be used to alter an image very quickly. However, despite the quick results, the image quality after a nearest neighbor interpolation is dramatically decreased, especially when the image is zoomed or undergoes a transformation such as rotation or skewing.

FIGS. 2A and 2B illustrate an interpolation using the bilinear technique according to the prior art.

Referring to FIG. 2A, an image is comprised of a matrix of pixels 200, including pixels 220, 221, 222 and 223. When the image is transformed using bilinear interpolation, for example when the image is enlarged, rotated, and the like, a new pixel matrix is mapped backwards to the original image space that includes pixel 203.

Referring to FIG. 2B, bilinear interpolation considers the closest 2×2 matrix of known pixel values surrounding the pixel to be interpolated. In this case, to determine the value of pixel 203, bilinear interpolation considers the 2×2 matrix including pixels 220, 221, 222 and 223. With the known pixel values, a weighted average of these values is used to arrive at a final interpolated value for pixel 203. More specifically, to determine the final interpolated value of pixel 203, the graphics engine performs calculations according to Equation (1).

$$c_iA = \alpha c_i 220 + (1-\alpha)c_i 221$$

$$c_iB = \alpha c_i 222 + (1-\alpha)c_i 223$$

$$c_i 203 = \beta c_i A + (1-\beta)c_i B \quad (1)$$

In Equation (1), i denotes the color channel (i.e., red, green, blue and alpha), $c_i$ denotes the value of the channel, $\alpha$ denotes an interpolation factor according to the horizontal distance, and $\beta$ denotes an interpolation factor according to the vertical distance.

An advantage of bilinear interpolation is that the transformed image is much smoother than that achieved using the nearest neighbor technique. A disadvantage of bilinear interpolation is the amount of mathematical calculations required to determine a pixel color. The calculation is so expensive in terms of processing steps that it is much slower as compared with the nearest neighbor technique, especially in light of a mobile terminal's limited processing power. As can be deduced from Equation (1), each pixel requires 12 bilinear interpolations including 3 sets of color calculations, wherein each set contains 4 bilinear interpolations for the red, green, blue and alpha channel, respectively. In other words, 24 multiplication instructions and 12 addition instructions plus 5 bitwise logical instructions for decomposing and composing color channels, or, in the alternative, 12 multiplication instructions and 24 addition instructions plus 5 bitwise logical instructions are necessary for each pixel.

Several methods to optimize bilinear interpolation have been proposed, such as parallel calculation. However, the proposed methods still follow the basic interpolation formula and cannot provide a significant improvement in performance, especially on a software based graphics platform that is used on most mobile handsets. Accordingly, as mobile terminals continue to be provided with advanced user interfaces, and as advanced applications become more and more popular, there is a need for an efficient image interpolation method to render images under 2-Dimensional geometric transformation.

SUMMARY OF THE INVENTION

An aspect of the present invention is to address at least the above-mentioned problems and/or disadvantages and to provide at least the advantages described below. Accordingly, an aspect of the present invention is to provide an apparatus and method for efficiently interpolating and rendering an image on a mobile device.

In accordance with an aspect of the present invention, a method for providing a user interface in a mobile terminal having a software mode and a hardware mode is provided. The method includes obtaining a plurality of super pixels by virtually increasing a resolution of the original image, determining a sampling position of a target image pixel under transformation, selecting the nearest super pixel from the plurality of super pixels for the target image pixel, and determining a characteristic of the selected nearest super pixel for the target image pixel.

In accordance with another aspect of the present invention, an apparatus for providing a user interface in a mobile terminal having a software mode and a hardware mode is provided. The apparatus includes a control unit for obtaining a plurality of super pixels by virtually increasing a resolution of the original image, for determining a sampling position of a target image pixel under transformation, for selecting the nearest super pixel from the plurality of super pixels for the target image pixel, and for determining a characteristic of the selected nearest super pixel for the target image pixel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
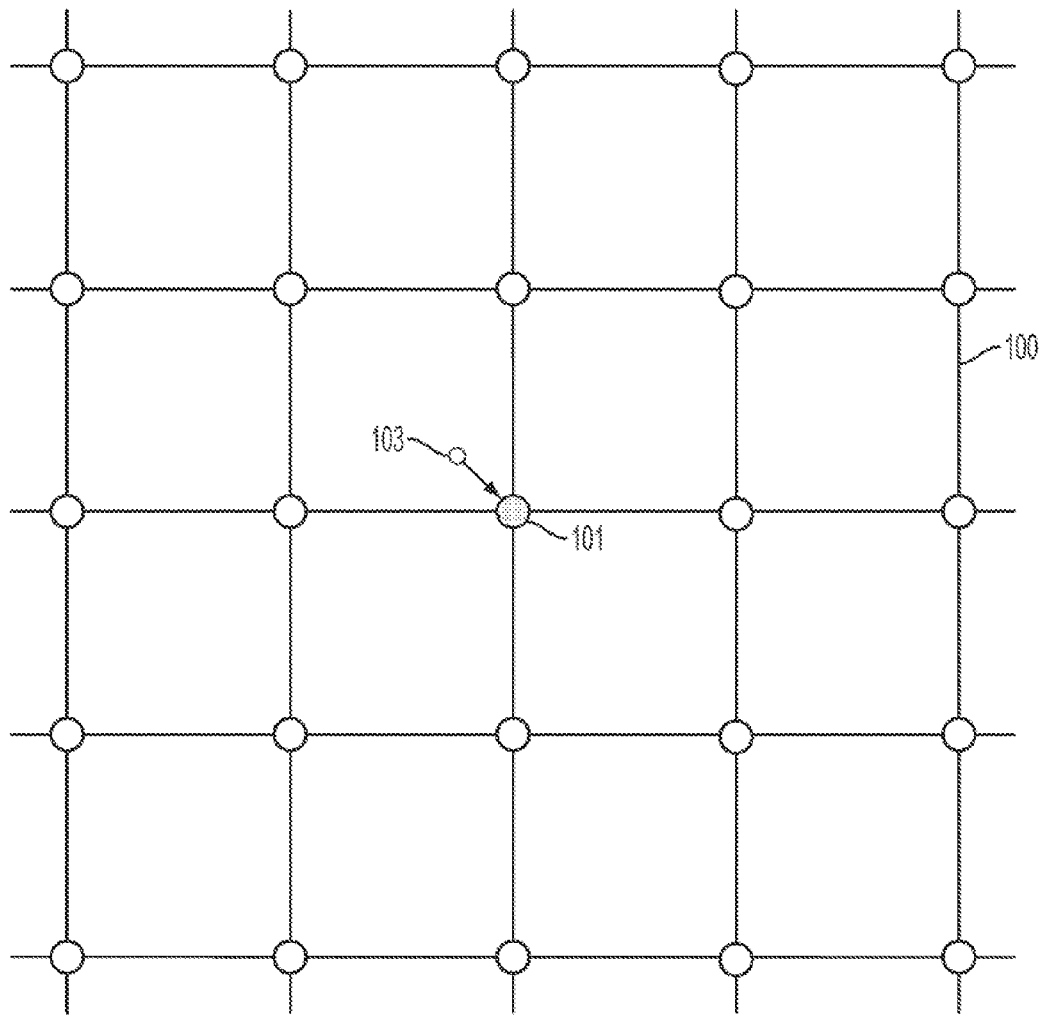
FIG. 1 illustrates an interpolation using the nearest neighbor technique according to the prior art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal" However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Exemplary embodiments of the present invention include an apparatus and method for efficiently interpolating an image that is achieved more quickly than that with bilinear interpolation while providing an image that is smoother than that achieved with the nearest neighbor technique. In an exemplary implementation, a super sampling process is used to combine certain advantages of the nearest neighbor and bilinear interpolation techniques. The exemplary process lowers the calculation cost in terms of resources and time, while rendering an image having substantially the same quality as achieved with bilinear interpolation.

More specifically, exemplary embodiments of the present invention provide an apparatus and method for super sampling. As will be described in more detail below, super sampling includes dynamically increasing the virtual resolution of an original image on-demand by color interpolation to obtain new pixels. The new pixels are referred to as super pixels. Using the super pixels, a nearest neighbor technique can be used to select characteristic values for a pixel of a transformed image. Thus, using the super pixels, a smoother transformed image can be achieved as compared to the nearest neighbor technique, while reducing the amount of necessary calculations as compared to the bilinear technique.

Figure 3:
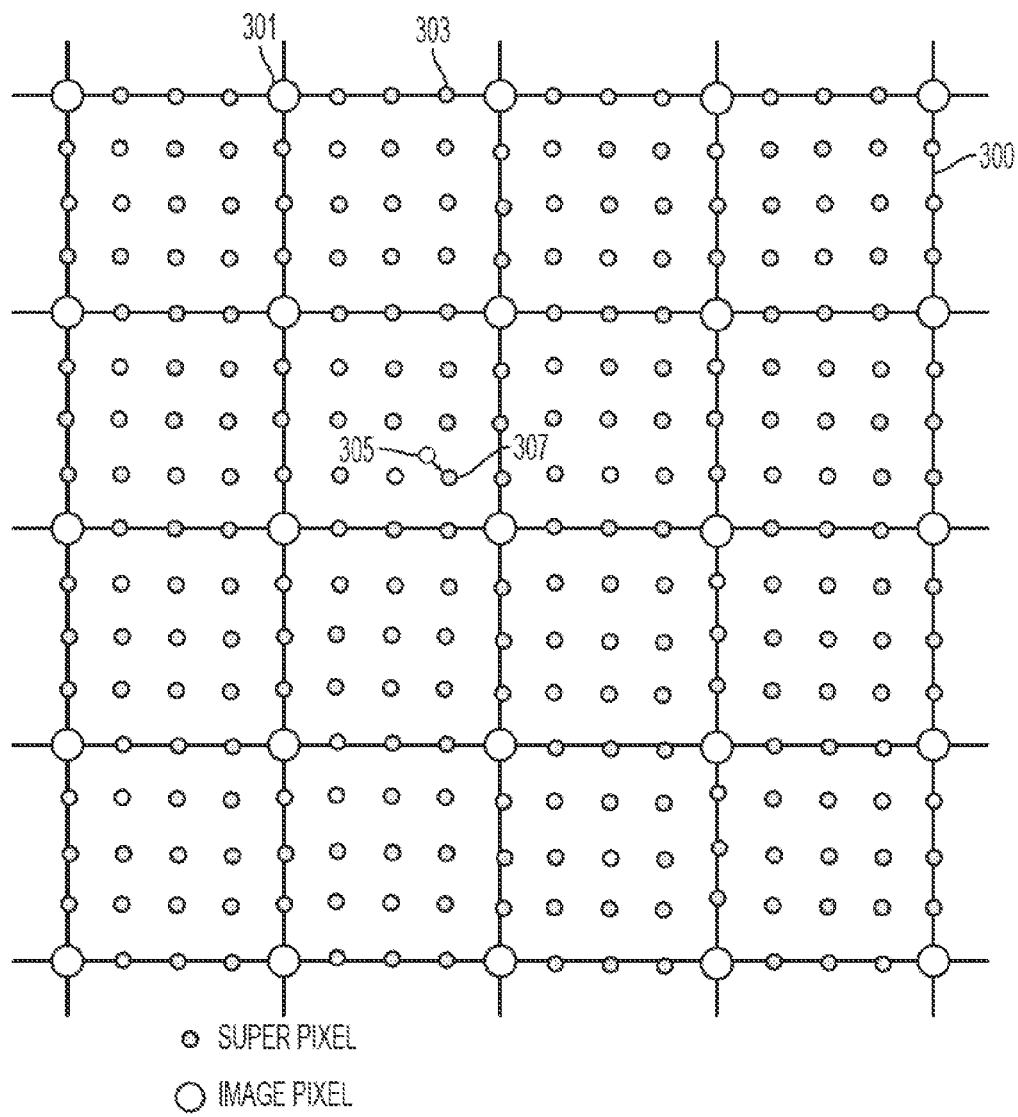
FIG. 3 illustrates an image interpolation according to an exemplary embodiment of the present invention.

FIG. 3 illustrates an image interpolation according to an exemplary embodiment of the present invention.

Figure 2A:
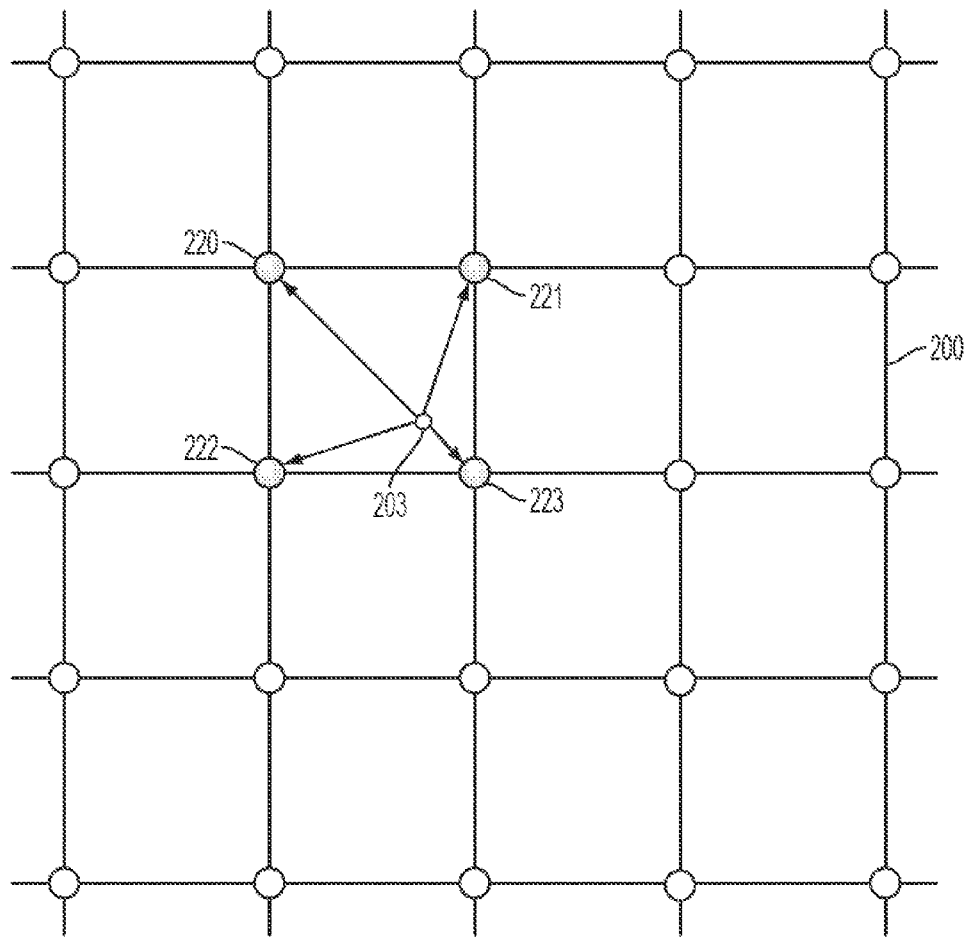
FIGS. 2A and 2B illustrate an interpolation using the bilinear technique according to the prior art.
Figure 2B:
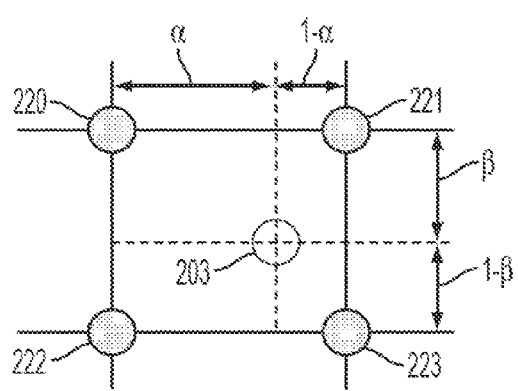

Referring to FIG. 3, an original image is comprised of a matrix of pixels 300, such as pixel 301. To transform the original image by interpolation, the resolution of the original image is conceptually and at least partially increased by color interpolation to obtain a matrix of super pixels such as super pixel 303 and super pixel 307. With the virtual matrix of super pixels obtained, the characteristics of an interpolated pixel 305 can be determined using a nearest neighbor process. In the case of interpolated pixel 305, the nearest neighbor is super pixel 307. Accordingly, the characteristics of interpolated pixel 305 will be based on super pixel 307. More specifically, a matrix of super pixels, including, for this example, super pixel 307, is virtually determined. Virtual determination of the matrix of super pixels does not alter the actual resolution of the original image. Rather, the locations of the super pixels of the virtual matrix are used for a nearest neighbor process to determine aspects of interpolated pixel 305. Accordingly, in an exemplary implementation, the virtual matrix of super pixels need not be determined for the entire original image. For example, determination of the virtual matrix may include determination of super pixel 307, but not determination of super pixel 303, despite both being illustrated in FIG. 3. After the virtual matrix is established and based on the nearest neighbor determination, the color of any given super pixel is calculated on-demand. For example, a virtual matrix of super pixels including super pixel 307 is determined. However, only when the particular super pixel 307 is selected as the nearest neighbor of target pixel 305 is the color of super pixel 307 determined. This method takes advantage of the fact that color calculation with fixed pattern supper sampling is much faster than the bilinear interpolation which calculates colors on an arbitrary sampling position as explained above with reference to FIGS. 2A and 2B. Moreover, the quality of the rendered result is guaranteed for images under transformation within a certain scope determined by the super sampling pattern, as explained in more detail below.

In more detail, an exemplary process of image interpolation and rendering includes determining a super sampling pattern, determining the sampling position of each target image pixel, selecting the nearest super pixel in the original image space for each sampling position, and determining the color of the selected super pixel for each target pixel.

The first step to interpolate and render an image is to choose a super sampling pattern. In an exemplary implementation, the super sampling pattern is chosen based on a $2^x \times 2^x$ matrix. As will be explained in more detail below, use of a $2^x \times 2^x$ matrix allows for faster color calculation. When the size of the $2^x \times 2^x$ matrix is increased, that is when the value of "x" is increased, a greater sampling intensity can be achieved and lead to an even smoother transformed image. However, the larger matrix will result in a higher interpolation cost due to additional calculations for each super pixel. In an exemplary embodiment, x is set to 2 such that a 4×4 matrix is used. The 4×4 matrix will generally provide an acceptable image quality under at least 16 time zooming or any transformation in the same geometric scope, while not requiring excessive calculations. However, it is to be understood that the value of "x" need not set to 2 and can be any integer greater than 0. Moreover, it is understood that the matrix need not be a $2^x \times 2^x$ matrix but instead can be any square matrix, such as a $3^x \times 3^x$ matrix, or a non-square matrix. According to an exemplary embodiment, the super sampling pattern is not applied to the entire original image. That is, super pixels are obtained based on application of the super sampling pattern to a selected subset of the original image. By selectively applying the super sampling pattern, the amount of resources necessary for determining the super pixels is reduced.

The sampling position of a transformed target image pixel is determined using a backward 2-Dimensional (2D) linear affine transformation. In an exemplary implementation, the backward 2D linear affine transformation can be represented as 3×3 matrix M. In that case, for a given pixel p, the sampling position p' in the source image is given by Equation (2).

$$p' = Mp$$

$$p = (x,y,1) \; p' = (x',y',1) \quad (2)$$

The linear transformation using Equation (2) can be determined incrementally for pixel arrays in the target image.

Based on the determined super sampling pattern and the determined sampling position of the target image pixel 305, the nearest super pixel 307 is selected by sampling position. That is, using the nearest neighbor technique as discussed above, the nearest super pixel 307 is selected for the determined sampling position of the target image pixel 305.

Having selected the nearest super pixel 307, the color of the selected super pixel 307 is determined and used to assign characteristics of the target image pixel 305.

As will be illustrated in more detail below, a benefit of the super sampling process is the ability to quickly determine color for the fixed sampling pattern of the super pixels as opposed to the arbitrary sampling position as required in the bilinear technique. Furthermore, parallel calculation is much easier for color channels of pixels on fixed super sampling pattern using even simple integer instructions without Single Instruction Multiple Data (SIMD) extensions.

Figure 4:
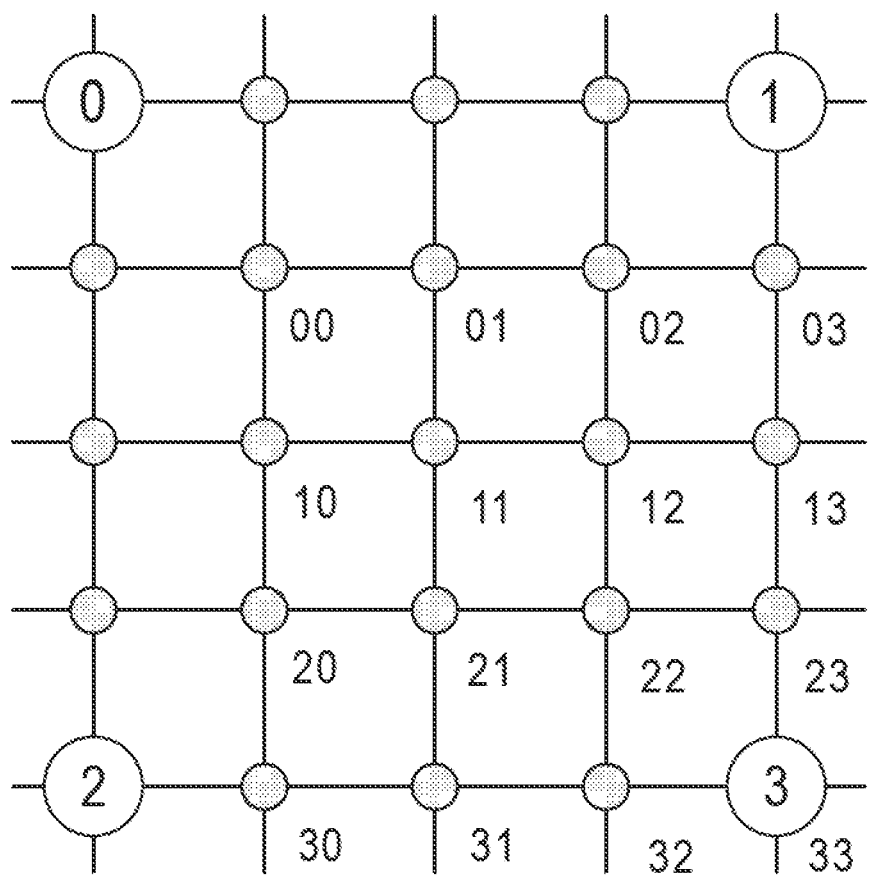
FIG. 4 illustrates a 4×4 matrix of super pixels according to an exemplary embodiment of the present invention.

FIG. 4 illustrates a 4×4 matrix of super pixels according to an exemplary embodiment of the present invention.

Referring to FIG. 4, an original image is comprised of a matrix of pixels including pixels 0, 1, 2 and 3. The 4×4 matrix of super pixels includes pixels 00, 01, 02, 03, 10, 11, 12, 13, 20, 21, 22, 23, 30, 31, 32, and 33. Based on the color of at least one of pixels 0, 1, 2, or 3, the color of any of super pixels 00-33 can be determined. That is, because each of super pixels 00-33 is adjacent to original image pixels 0-3 by a varying degree, the color of any of super pixel 00-33 can be determined based on its proximity to at least one of pixels 0-3. More specifically, based on the color values of pixels 0-3 of the original image, the individual color channel for each of the 16 super pixels 00-33 can be determined using Equation (3).

$ci00 = ci0*9/16 + ci1*3/16 + ci2*3/16 + ci3/16$ $ci01 = ci0*3/8 + ci1*3/8 + ci2/8 + ci3/8$ $ci02 = ci0*3/16 + ci1*9/16 + ci2/16 + ci3*3/16$ $ci03 = ci1*3/4 + ci3/4$ $ci10 = ci0*3/8 + ci1/8 + ci2*3/8 + ci3/8$ $ci11 = ci0/4 + ci1/4 + ci2/4 + ci3/4$ $ci12 = ci0/8 + ci*3/8 + ci2/8 + ci3*3/8$ $ci13 = ci1/2 + ci3/2$ $ci20 = ci0*3/16 + ci1/16 + ci2*9/16 + ci3*3/16$ $ci21 = ci0/8 + ci1/8 + ci2*3/8 + ci3*3/8$ $ci22 = ci0/16 + ci1*3/16 + ci2*3/16 + ci3*9/16$ $ci23 = ci1/4 + ci3*3/4$ $ci30 = ci2*3/4 + ci3/4$ $ci31 = ci2/2 + ci3/2$ $ci32 = ci2/4 + ci3*3/4$ $ci33 = ci3$ \quad (3)

In Equation (3), ciMN represents the color value of super pixel, i represents the red (R), green (G), blue (B) and alpha (A) color channel, MN represents the super pixel index, ciP represents the corresponding R, G, B, and A color channel values of the original pixel, and P presents the pixel index. In an exemplary implementation, the multiplications/divisions of Equation (3) can be replaced by bit shifting. An example of such bit shifting is illustrated in Equation (4).

$$c_0*9/16=(c_0>>1)+(c_0>>4)$$

$$c_0*3/16=(c_0>>2)-(c_0>>4)=(c_0>>3)-(c_0>>4)$$

$$c_0*3/8=(c_0>>1)-(c_0>>3)=(c_0>>2)-(c_0>>3) \quad (4)$$

In comparison with the bilinear interpolation technique, exemplary embodiments of the present invention reduce computation costs. Furthermore, parallel calculations can be used to achieve a significant performance boost. In a case in which a processor with SIMD capability is available, such as an Intel XScale processor, parallel calculation for 4 channel colors becomes straightforward. Moreover, for many processors without SIMD capability, parallel calculation is also feasible using normal integer instructions with slight error in the resultant color value, which is acceptable especially on most mobile devices with 16 bit color LCD.

As an example of parallel calculation using normal integer instructions, a 4×4 supper sampling pattern and 32 bit A8R8G8B8 color format are used to illustrate the simultaneous shifting and adding/subtracting of four color channels. An example of such simultaneous calculation to determine various values in Equation (3) is illustrated in Equation (5).

$$C0*3/8 \sim (C0>>1)-(C0>>3)=(C0>>1\&0x7F7F7F7F)-(C0>>3\&0x1F1F1F1F)$$

$$C0*3/16 \sim (C0>>2)-(C0>>4)=(C0>>2\&0x3F3F3F3F)-(C0>>4\&0x0F0F0F0F)$$

$$C0*9/16 \sim (C0>>1)+(C0>>4)=(C0>>1\&0x7F7F7F7F)+(C0>>3\&0x0F0F0F0F) \quad (5)$$

In Equation (5), C represents the 32 bit four channel color value. Using a parallel calculation such as that illustrated in Eq. (5), four color channels are processed simultaneously. On average, such parallel calculation needs only 5 addition instructions and 3 bitwise logical instructions for each target pixel. Accordingly, it is much more efficient as compared to bilinear interpolation which needs 12 multiplication instructions, 24 addition instructions and 5 bitwise logical instructions for each target pixel.

However, use of this unified shifting may cause a drop of some bits at the end of the color value. Accordingly, some error in the final result may occur. In an exemplary embodiment, the shifting error is minimized by mixing the addition/subtraction formula rather than using an addition only formula, as in Equation (4). It is easy to analyze the resultant error by adding all possible shifting errors.

Referring to each channel, the range of worst case errors based on use of Equation (3) are shown in Table 1.

TABLE 1

| c00: | c01: | c02: | c03: |
|---|---|---|---|
| [−3.875, 1.875] | [−2.75, 1.75] | [−3.875, 1.875] | [−0.9375, 0.9375] |
| c10: | c11: | c12: | c13: |
| [−2.75, 1.75] | [−3.75, 0] | [−2.75, 1.75] | [−1, 0] |
| c20: | c21: | c22: | c23: |
| [−3.875, 1.875] | [−2.75, 1.75] | [−3.875, 1.875] | [−0.9375, 0.9375] |
| c30: | c31: | c32: | c33: |
| [−0.9375, 0.9375] | [−1, 0] | [−0.9375, 0.9375] | [0, 0] |

Regarding the worst case errors in more detail, the worst-case error caused by shifting byte c occurs when dropped bits are all '1's. For example, in the instance of shifting 4 bits, the worst case error occurs for c having a value of xxxx1111. In that case, c loses a value of 0.9375. The worst-case errors for all cases are shown in Table 2.

TABLE 2

| c>>1 | c>>2 | c>>3 | c>>4 |
|---|---|---|---|
| [−0.5, 0] | [−0.75, 0] | [−0.875, 0] | [−0.9375, 0] |
| −c>>1 | −c>>2 | −c>>3 | −c>>4 |
| [0, 0.5] | [0, 0.75] | [0, 0.875] | [0, 0.9375] |

The final worst case error for each value of c00-c33 from Equation (3) is determined as the accumulated errors from single shifting. Considering c00 as an example, the worst case error is determined as illustrated in Equation (7).

$$c00=c0*9/16+c1*3/16+c2*3/16+c3*3/16 \sim c0>>4+c0>>1+c1>>2-c1>>4+c2>>2-c2>>4+c3>>4 \quad (7)$$

According to Equation (7), the worst case error for c00=[−0.9375, 0]+[−0.5, 0]+[−0.75, 0]+[0, 0.9375]+[−0.75, 0]+[0, 0.9375]+[−0.9375, 0]=[−3.875, 1.875]. Accordingly, the worst case error for c00 is [−3.875, 1.875]. The worst case values for the remaining super pixels c01-c33 can be determined in substantially the same way as illustrated in Equation (7) for c00.

Using the optimizations discussed above, exemplary embodiments of the present invention were tested with the results showing that images were rendered 5 times faster than the bilinear interpolation technique. These results were obtained on several mobile handsets using different processors such as the ARM11, ARM9 and ARM7 processor. Furthermore, the results obtained provided very similar image quality as compared to the bilinear interpolation technique. This is due to the conceptually increased resolution of the original image and the overall calculation error in the exemplary algorithm being very small.

Figure 5:
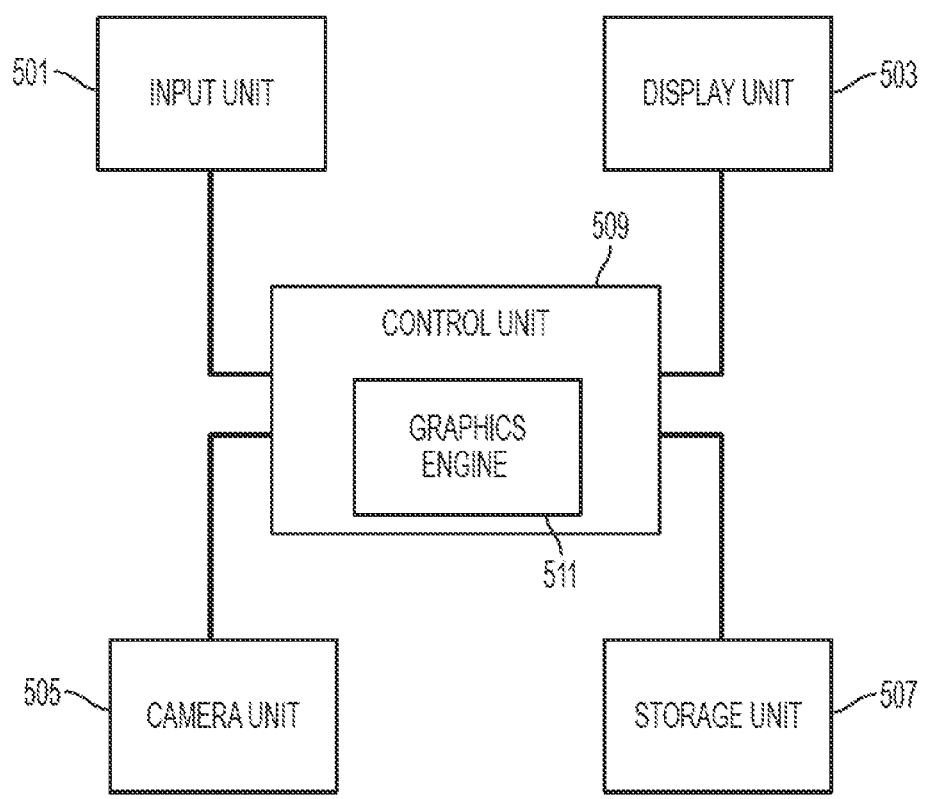
FIG. 5 illustrates a mobile terminal for interpolating an image according to an exemplary embodiment of the present invention.

FIG. 5 illustrates a mobile terminal for interpolating an image according to an exemplary embodiment of the present invention.

Referring to FIG. 5, the mobile terminal includes an input unit 501, a display unit 503, a camera unit 505, a storage unit 507, and a control unit 509.

The input unit 501 includes a plurality of alphanumeric keys that allow a user to select various inputs for manipulation of the mobile terminal. The input unit 501 may further include any of various soft keys and function keys. Also, the input unit 501 may include one or more touch sensors for providing user input. The input unit 501 provides input data corresponding, for example, to a key pressed by a user to the control unit 509.

The display unit 503 displays user interface, graphics and multimedia content of applications on the mobile terminal. According to an exemplary embodiment of the present invention, the display unit 503 displays the user interface and graphics content utilizing the image interpolation and rendering method discussed above. The display unit 503 may include a color Liquid Crystal Display (LCD). In this case, the display unit 503 may include a controller for controlling the LCD, a video memory in which image data is stored and an LCD element. If the LCD is provided as a touch screen, the display unit 503 may perform a part or all of the functions of the input unit 501.

The camera unit 505 is provided to capture images. Once captured, the images may be displayed on display unit 503 or saved in storage unit 507.

The storage unit 507 may include a volatile as well as a non-volatile memory. The storage unit 507 may have stored therein various data associated with applications on the mobile terminal. The images stored in storage unit 507 may be captured by the camera unit 505, downloaded by a user from the Internet, or associated with applications on the mobile terminal.

The control unit 509, including graphics engine 511, provides a platform service, image interpolation and rendering functionality, and executes the applications on mobile terminal. According to an exemplary embodiment of the present invention, the graphics engine 511 interpolates and renders transformed images using the technique as described above with reference to FIGS. 3 and 4, such as for an application's user interface and multimedia content. For example, for rendering a dynamic user interface with user interaction from input unit 501 or display unit 505, or rendering graphics animation of multimedia content, the graphics engine 511 processes to interpolate and render the image according to the above described method. More specifically, the graphics engine 511 determines a super sampling pattern, determines a sampling position of each target image pixel, selects a nearest super pixel of in the original image space for each sampling position, and determines the color of the selected super pixel for each target pixel. Accordingly, the graphics engine 511 is able to render a transformed image having an appearance substantially the same as that obtained using a bilinear technique while saving significant cost.

Certain aspects of the present invention can also be embodied as computer readable code on a computer readable recording medium. A computer readable recording medium is any data storage device that can store data that can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transforming an original image into a target image by interpolation, the method comprising:
obtaining a plurality of super pixels by virtually increasing a resolution of the original image;
determining a sampling position of a target image pixel under transformation;
selecting the nearest super pixel from the plurality of super pixels for the target image pixel; and
determining a color of the selected nearest super pixel for the target image pixel by determining the color of at least one pixel of the original image that is adjacent to the selected nearest super pixel and applying a weighted average of the at least one pixel characteristic by parallel calculation of four color channels with one of Single Instruction Multiple Data (SIMD) integer instructions and no SIMD integer instructions.

2. The method of claim 1, wherein the virtually increasing of the resolution of the original image comprises determining a sampling pattern for super pixels in the original image space.

3. The method of claim 2, wherein the determining of the sampling pattern for super pixels in the original image space comprises determining a size of a matrix used for sampling.

4. The method of claim 3, wherein the determining of the size of the matrix used for sampling comprises using a $2^x \times 2^x$ matrix for sampling, wherein x is an integer greater than 0.

5. The method of claim 1, wherein the determining of the sampling position of the target image pixel comprises performing a backward 2-Dimensional (2D) linear affine transformation.

6. The method of claim 1, wherein the selecting of the nearest super pixel comprises using a nearest neighbor technique.

7. The method of claim 1, wherein the applying of the weighted average of the at least one pixel color comprises applying the at least one pixel color based on the proximity of the corresponding at least one pixel of the original image to the selected nearest super pixel.

8. The method of claim 1, wherein the obtaining of the plurality of super pixels by virtually increasing a resolution of the original image comprises virtually increasing the resolution of the entire original image.

9. An apparatus for efficiently interpolating and rendering a transformed image, the apparatus comprising:
a control unit for obtaining a plurality of super pixels by virtually increasing a resolution of the original image, for determining a sampling position of a target image pixel under transformation, for selecting the nearest super pixel from the plurality of super pixels for the target image pixel, and for determining a color of the selected nearest super pixel for the target image pixel by determining the color of at least one pixel of the original image that is adjacent to the selected nearest super pixel and applying a weighted average of the at least one pixel characteristic by parallel calculation of four color channels with one of Single Instruction Multiple Data (SIMD) integer instructions and no SIMD integer instructions.

10. The apparatus of claim 9, wherein the control unit virtually increases the resolution of the original image by determining a sampling pattern for super pixels in the original image space.

11. The apparatus of claim 10, wherein the control unit determines the sampling pattern for super pixels in the original image space by determining a size of a matrix used for sampling.

12. The apparatus of claim 11, wherein the control unit determines the size of the matrix used for sampling by using a $2^x \times 2^x$ matrix for sampling, wherein x is an integer greater than 0.

13. The apparatus of claim 9, wherein the control unit determines the sampling position of the target image pixel by performing a backward 2-Dimensional (2D) linear affine transformation.

14. The apparatus of claim 12, wherein the control unit selects the nearest super pixel by using a nearest neighbor technique.

15. The apparatus of claim 9, wherein the control unit applies the weighted average of the at least one pixel color by applying the at least one pixel color based on the proximity of the corresponding at least one pixel of the original image to the selected nearest super pixel.

16. The apparatus of claim 9, wherein the control unit obtains the plurality of super pixels by virtually increasing a resolution of the entire original image.

* * * * *